United States Patent
Li et al.

(10) Patent No.: US 9,490,067 B2
(45) Date of Patent: Nov. 8, 2016

(54) JOINING DISSIMILAR MATERIALS USING AN EPOXY RESIN COMPOSITION

(71) Applicants: Chao Li, Franklin, WI (US); Stephen John Rigby, Racine, WI (US); Clay Lynwood Fellers, Little Mountain, SC (US); Marco James Mason, Greenwood, SC (US); Saboura Rokhsair Azar, Milwaukee, WI (US)

(72) Inventors: Chao Li, Franklin, WI (US); Stephen John Rigby, Racine, WI (US); Clay Lynwood Fellers, Little Mountain, SC (US); Marco James Mason, Greenwood, SC (US); Saboura Rokhsair Azar, Milwaukee, WI (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 298 days.

(21) Appl. No.: 14/075,350

(22) Filed: Nov. 8, 2013

(65) Prior Publication Data

US 2015/0132581 A1    May 14, 2015

(51) Int. Cl.
*H01G 2/10* (2006.01)
*B32B 9/04* (2006.01)
(Continued)

(52) U.S. Cl.
CPC ............... *H01G 2/103* (2013.01); *B32B 7/12* (2013.01); *B32B 9/005* (2013.01); *B32B 9/041* (2013.01); *B32B 15/08* (2013.01); *B32B 15/18* (2013.01); *B32B 17/061* (2013.01); *B32B 37/1284* (2013.01); *C09J 163/00* (2013.01); *C09J 163/04* (2013.01); *H01G 4/224* (2013.01); *H01G 9/10* (2013.01); *B32B 2037/1253* (2013.01); *B32B 2250/02* (2013.01); *B32B 2255/06* (2013.01); *B32B 2255/26* (2013.01); *B32B 2305/72* (2013.01); *B32B 2307/206* (2013.01); *B32B 2307/536* (2013.01); *B32B 2310/021* (2013.01); *B32B 2311/00* (2013.01); *B32B 2315/02* (2013.01); *B32B 2315/08* (2013.01); *B32B 2457/16* (2013.01); *Y10T 428/31518* (2015.04); *Y10T 428/31522* (2015.04)

(58) Field of Classification Search
CPC .. H01G 2/103; B32B 37/1284; B32B 9/041; B32B 17/061; B32B 15/08; B32B 7/12; C09J 163/00; C09J 163/04
USPC ......................................................... 156/330
See application file for complete search history.

(56) References Cited

U.S. PATENT DOCUMENTS 2,333,354 A    11/1941    Andersen et al.
2,977,414 A    8/1961    Netherwood et al.
(Continued)

FOREIGN PATENT DOCUMENTS

SU    1065458 A    7/1984
WO    2005003108 A1    1/2005
(Continued)

OTHER PUBLICATIONS

The PCT International Search Report and Written Opinion from Corresponding Application No. PCT/US2014/063983, mailed Mar. 19, 2015 (6 pages).

*Primary Examiner* — Daniel Lee
(74) *Attorney, Agent, or Firm* — King & Spalding LLP (57) ABSTRACT

An epoxy resin composition is disclosed for joining dissimilar materials. The identified epoxy resin compositions can be used to seal metallic and non-metallic components of a capacitor. Specifically the epoxy resin composition can be applied to joints between a non-metallic capacitor bushing and a metallic tank cover and metallic terminal cap. Once the epoxy resin composition is cured, it can provide a seal that can withstand the stresses and environmental conditions to which a capacitor is subjected.

15 Claims, 6 Drawing Sheets

(51) Int. Cl.
*C09J 163/04* (2006.01)
*B32B 15/08* (2006.01)
*B32B 7/12* (2006.01)
*C09J 163/00* (2006.01)
*B32B 37/12* (2006.01)
*B32B 17/06* (2006.01)
*B32B 9/00* (2006.01)
*B32B 15/18* (2006.01)
*H01G 9/10* (2006.01)
*H01G 4/224* (2006.01)

(56) References Cited

U.S. PATENT DOCUMENTS

| | | | |
|---|---|---|---|
| 3,140,859 A | 7/1964 | Scarpa | |
| 3,368,175 A | 2/1968 | Giegerich et al. | |
| 3,505,630 A | 4/1970 | Merrill et al. | |
| 3,647,405 A | 3/1972 | Smith | |
| 3,674,586 A | 7/1972 | Rimkus | |
| 3,723,930 A | 3/1973 | Koch | |
| 4,595,557 A | 6/1986 | Bowsky | |
| 4,846,163 A | 7/1989 | Bannister, Jr. et al. | |
| 5,161,728 A | 11/1992 | Li | |
| 5,371,650 A | 12/1994 | Lavene | |
| 5,766,517 A * | 6/1998 | Goedde | H01F 27/12 252/570 |
| 5,935,372 A | 8/1999 | Rojstaczer et al. | |
| 6,500,795 B2 | 12/2002 | Pham et al. | |
| 6,627,966 B2 | 9/2003 | Jeong et al. | |
| 7,857,194 B2 | 12/2010 | Kramer | |
| 8,082,663 B1 | 12/2011 | Monroe et al. | |
| 8,361,271 B2 | 1/2013 | Aihara et al. | |
| 2004/0251237 A1 | 12/2004 | Meyer et al. | |
| 2006/0194064 A1 * | 8/2006 | Xiao | C08G 59/5093 428/414 |
| 2011/0267791 A1 * | 11/2011 | Tomisaka | C09J 9/02 361/783 |

FOREIGN PATENT DOCUMENTS

| | | |
|---|---|---|
| WO | 2008071792 A1 | 6/2008 |
| WO | 2010147070 A1 | 12/2010 |

* cited by examiner

JOINING DISSIMILAR MATERIALS USING AN EPOXY RESIN COMPOSITION

TECHNICAL FIELD

Embodiments described herein relate generally to joining dissimilar materials, such as metallic and non-metallic materials, using an epoxy resin composition.

BACKGROUND

Joining dissimilar materials, such as metallic and non-metallic materials, often presents a variety of technical challenges. Not only are dissimilar materials resistant to many types of conventional joining methods, even joints that are formed may not be able to withstand substantial stress or harsh environmental conditions. These challenges are particularly true for electrical equipment that is placed outdoors, however, harsh environmental factors such as high temperatures can also be present in indoor environments. For example, in the case of capacitor tanks, there is a need to join non-metallic capacitor bushings to metallic terminal caps and metallic tank covers. Capacitor bushings serve several functions. The primary function of the bushing is to isolate electrical leads, which may be at thousands of volts of electric potential, from the metal body of the capacitor tank and from each other. The capacitor bushing is also used to isolate the contents on the inside of the capacitor from the outside environment. It is necessary to protect the internal capacitor components from contact with the exterior environment since contamination by moisture or dust may degrade the dielectric capacitor fluid and lead to capacitor failure. Also, the capacitor bushing seals the dielectric fluid inside the capacitor and prevents it from escaping to the environment.

Currently, there are several different approaches that can be used to join these metallic and non-metallic surfaces. One example is soldering. Soldering the capacitor bushings typically involves a complicated procedure wherein two coats of a thick silver-based painted film are applied to the capacitor bushing in a carefully controlled process. The coats of paint are dried and then the capacitor bushing is fired at high temperatures under carefully controlled conditions. After the firing process, the capacitor bushing can be soldered to metallic components. The soldering process can be complex, labor-intensive and expensive.

An alternative approach to joining metallic and non-metallic surfaces is to use mechanical components and fasteners. However, mechanical fastening requires additional components which add expense and complexity to the capacitor tank and mechanical fasteners may provide insufficient joint strength for some applications and may lose sealing integrity under mechanical stress over the life of the capacitor as it is exposed to harsh environmental conditions.

Accordingly, there is a need for an improved method for joining dissimilar materials such as the metallic and non-metallic components used to manufacture capacitor tanks. Specifically, there is a need for an improved technique for joining metallic and non-metallic components that is a less expensive and simpler process and that produces a stronger joint with more reliable sealing properties during the life of the capacitor.

SUMMARY

In general, in one aspect, the disclosure relates to a novel application of an epoxy resin composition for joining dissimilar materials. Specifically, in one embodiment, the disclosure relates to a method for forming a cured seal between an insulating material and a metallic component. The example method includes applying an epoxy resin composition to a portion of one or both of the insulating material and the metallic component. The insulating material and the metallic component are joined such that the epoxy resin composition forms a seal between the insulating material and the metallic component. The seal is then cured to form the cured seal. The insulating material can comprise one or more of glass, ceramic, epoxy, glazed material, or other polymers. The epoxy resin composition can comprise a phenol novolac epoxy, a bisphenol A epoxy, or a combination thereof, and a curing agent. In the example of a capacitor, once the seal is cured and the capacitor is completely assembled, the cured seal can be exposed to one or more aromatic compounds that are placed within the capacitor.

In another aspect, the disclosure can generally relate to an apparatus that includes an epoxy resin composition that joins two dissimilar materials. Specifically, the apparatus can include an insulating material, a metallic component, and a cured seal between the insulating material and the metallic component. The cured seal can comprise an epoxy resin composition that includes a phenol novolac epoxy, a bisphenol A epoxy, or a combination thereof, and a curing agent. The insulating material can comprise one or more of glass, ceramic, epoxy, glazed material, or other polymers. In the example of a capacitor, the epoxy resin composition is cured to form the cured seal between a capacitor bushing made of an insulating material and a metallic cover and a metallic terminal cap. Once the capacitor is assembled, the cured seal can be exposed to one or more aromatic compounds that are placed within the capacitor.

In yet another aspect, the disclosure can relate to a method for forming a cured seal between an insulating material and a metallic component. The example method includes applying a first part of a composition to the insulating material and applying a second part of the composition to the metallic component. The insulating material and the metallic component are joined such that the first part and the second part of the composition are combined and form an epoxy resin composition between the insulating material and the metallic component. The epoxy resin composition is then cured to form a cured seal. The insulating material can comprise one or more of glass, ceramic, epoxy, glazed material, or other polymers. The epoxy resin composition can comprise a phenol novolac epoxy, a bisphenol A epoxy, or a combination thereof, and a curing agent. In the example of a capacitor, once the epoxy resin composition is cured and the capacitor is completely assembled, the cured seal can be exposed to one or more aromatic compounds that are placed within the capacitor.

These and other aspects, objects, features, and embodiments will be apparent from the following description and the appended claims.

BRIEF DESCRIPTION OF THE DRAWINGS

The drawings illustrate only example embodiments of joining dissimilar materials using an epoxy resin composition and are therefore not to be considered limiting of its scope. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods for joining dissimilar materials. One example embodiment described herein involves joining metallic and non-metallic components of a capacitor using an epoxy resin composition. However, the novel application of the disclosed epoxy resin compositions can also be applied to other types of devices where there is a need to join dissimilar materials. For example, the disclosed epoxy resin compositions can also be used to join dissimilar materials found in other electrical components such as fuses, switchgear, regulators, and transformers. Thus, the novel application of the disclosed epoxy resin compositions is not limited to the capacitor example provided herein.

The terms "joint" and "cured seal" are used interchangeably herein and one term should not be interpreted as excluding the other, rather, the terms should be given their broadest reasonable interpretation. The term "insulating material" as used herein is one type of non-metallic material that includes a number of non-metallic materials, but it should be understood that certain non-metallic materials are not effective insulators.

Figure 1:
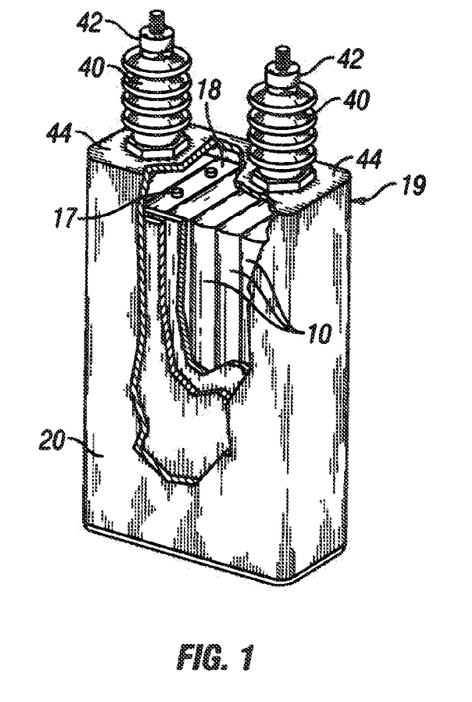
FIG. 1 shows a perspective view of a capacitor partially cut away in accordance with certain example embodiments.

Referring now to the example of the capacitor tank, FIG. 1 shows a capacitor 19 comprised of one or more capacitor windings 10 in a casing 20. The casing 20 is filled with a dielectric fluid. Taps 17 and 18 from capacitor windings 10 are joined together electrically to leads, not shown, passing through capacitor bushings 40 and terminal caps 42. Taps 17 and 18 may be eliminated in some methods of capacitor construction and the electrical leads may be connected directly to the capacitor windings 10. The example capacitor 19 of FIG. 1 may comply with one or more standards as set forth for example by the International Electrotechnical Commission (IEC) or the Institute of Electrical and Electronics Engineers (IEEE), such as the requirements in IEC 60871-1:2005, Section 12—Sealing Test and/or IEEE 18:2012, Section 7.2.3—Leak Test.

Capacitor windings 10 typically include a pair of spaced, metal foil electrodes and intermediate polypropylene film layers so that pairs of polypropylene film layers are found between foil electrode layers throughout the windings as is well known in the art. Taps 17 and 18 are inserted into the capacitor windings 10 to lie adjacent to the electrode layers to serve as electrical connections for the electrodes. As referenced above, alternate embodiments of the capacitor can be constructed with extended metal layer electrodes connecting to electrical leads which eliminate the need for separate taps. Electrical leads (not shown) connecting taps 17 and 18 to external electrical connections at terminal caps 42 are electrically insulated from the casing 20 of capacitor 19. Casing 20 and tank cover 44 are typically fabricated from a durable metal material such as stainless steel, however, other durable non-metallic materials could be used as well. The terminal caps 42 are typically manufactured from one or more metallic materials. For example, in one embodiment, the terminal caps 42 can be made with brass that is plated with tin.

The capacitor windings 10 are also typically immersed in a dielectric fluid such as, for example, mixtures of one or more of monobenzyl toluene, diphenyl ethane, and dibenzyl toluene. The dielectric fluid typically comprises one or more aromatic fluids which can have corrosive effects on certain materials. Typically, water vapor is removed from the dielectric fluid and the components of the capacitor windings 10 as part of the assembly of the capacitor 19.

In order to maintain capacitor 19 and the dielectric fluid free of water and other impurities, the capacitor 19 must be sealed. The capacitor seals must be able to withstand constant exposure to an environment which includes prolonged exposure to sunlight, extreme temperature variations, and exposure to the elements. In general, the capacitor seals must withstand conditions that exist at the top of utility poles or in electrical substations subjected to all types of geographical conditions and meteorological conditions found throughout the world. The capacitor seals are generally expected to be capable of lasting for a useful life of approximately thirty years.

Figure 2:
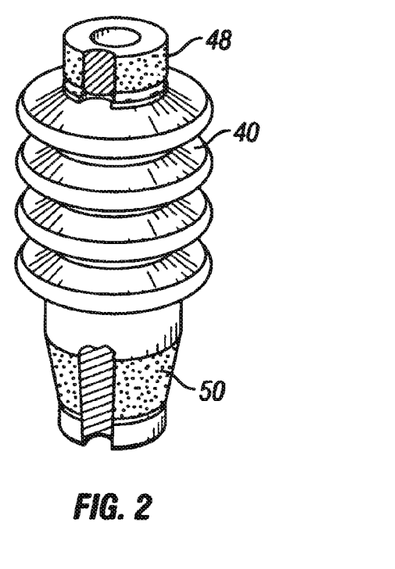
FIG. 2 shows a perspective view of a capacitor bushing partially cut away in accordance with certain example embodiments.
Figure 3:
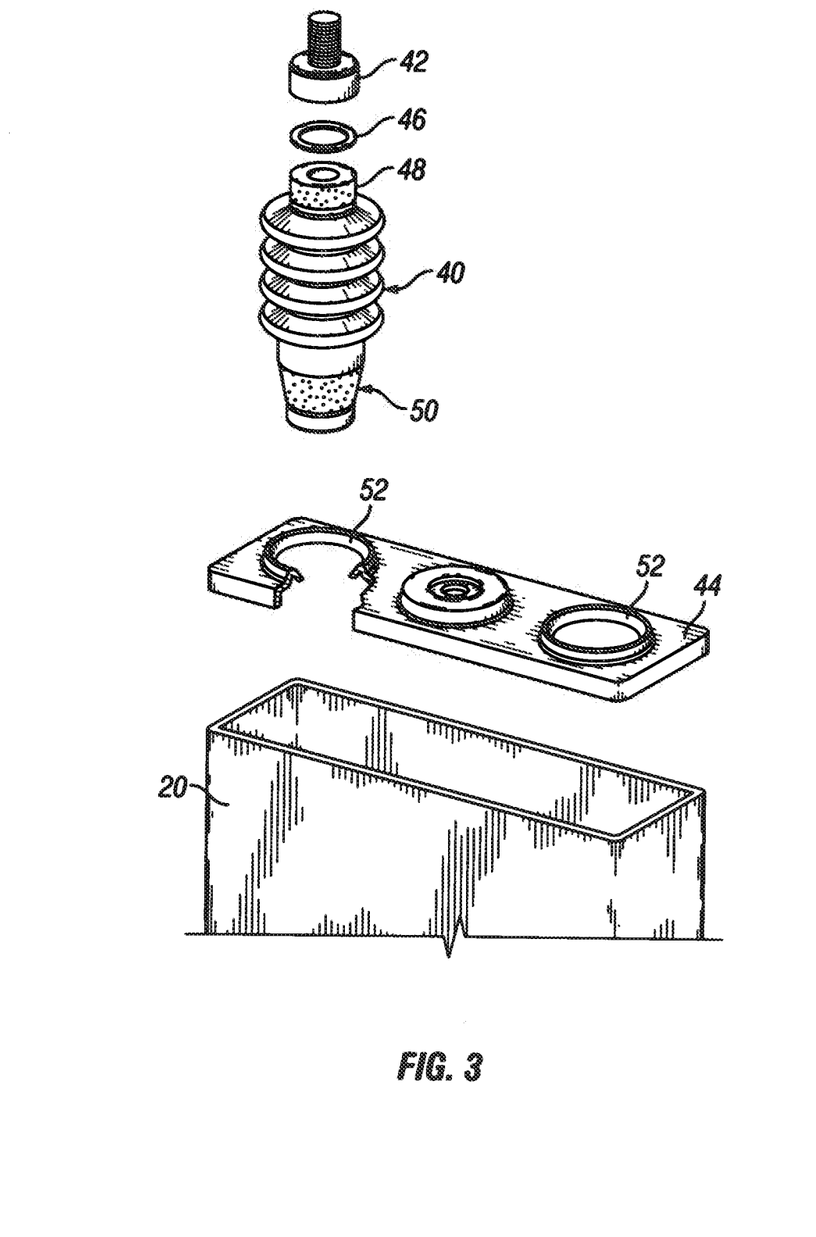
FIG. 3 shows an exploded view of a capacitor bushing, tank top, metal casing, terminal cap, and O-ring in accordance with certain example embodiments.

Sealing capacitor 19 is difficult because capacitor bushing 40 is typically comprised of ceramic, epoxy or another insulating material. Insulating material is not readily joined to metal parts such as the metal casing 20 and terminal cap 42. As shown in FIGS. 2 and 3, the capacitor bushing 40 must be sealed at two places, the top end 48 of the bushing 40 where it connects with terminal cap 42 and the lower end 50 of bushing 40 where it connects with tank cover 44 through opening 52. O-ring 46 is an optional component that can be included between terminal cap 42 and bushing 40 in certain embodiments. The O-ring 46 can accommodate differences in coefficients of expansion and contraction between the metal terminal cap 42 and the non-metallic bushing 40 to reduce or eliminate stresses between the materials.

It was previously believed in this field that a polymer such as an epoxy resin would be incapable of achieving a seal of adequate strength needed for the capacitor, which is typically expected to have a life of 30 years. For example, such polymers may be incapable of withstanding the stresses and weather conditions to which capacitors are typically subjected. Furthermore, it was believed that polymers could not withstand prolonged exposure to the aromatic components of the dielectric fluid within the capacitor.

In accordance with the present disclosure, certain epoxy resin compositions have been identified as unexpectedly providing performance characteristics necessary for sealing capacitors. In particular, epoxy resin compositions comprising a curing agent and either a phenol novolac epoxy, a bisphenol A epoxy, or a combination of the two epoxies have been found to provide a seal with unexpectedly favorable characteristics when joining metallic and non-metallic components of a capacitor. The curing agent of the epoxy resin composition can be a hardener, a catalyst, or a combination of a hardener and a catalyst. Example hardeners include, but are not limited to, amine-containing hardeners such cyanamide and dicyandiamide. Examples of commercially available epoxy resin compositions having the foregoing components and producing seals with favorable characteristics include Loctite E-214 HP epoxy, Masterbond Sup 10 HT epoxy, Permabond ES569 epoxy, and Permabond ES550 epoxy.

Figure 4:
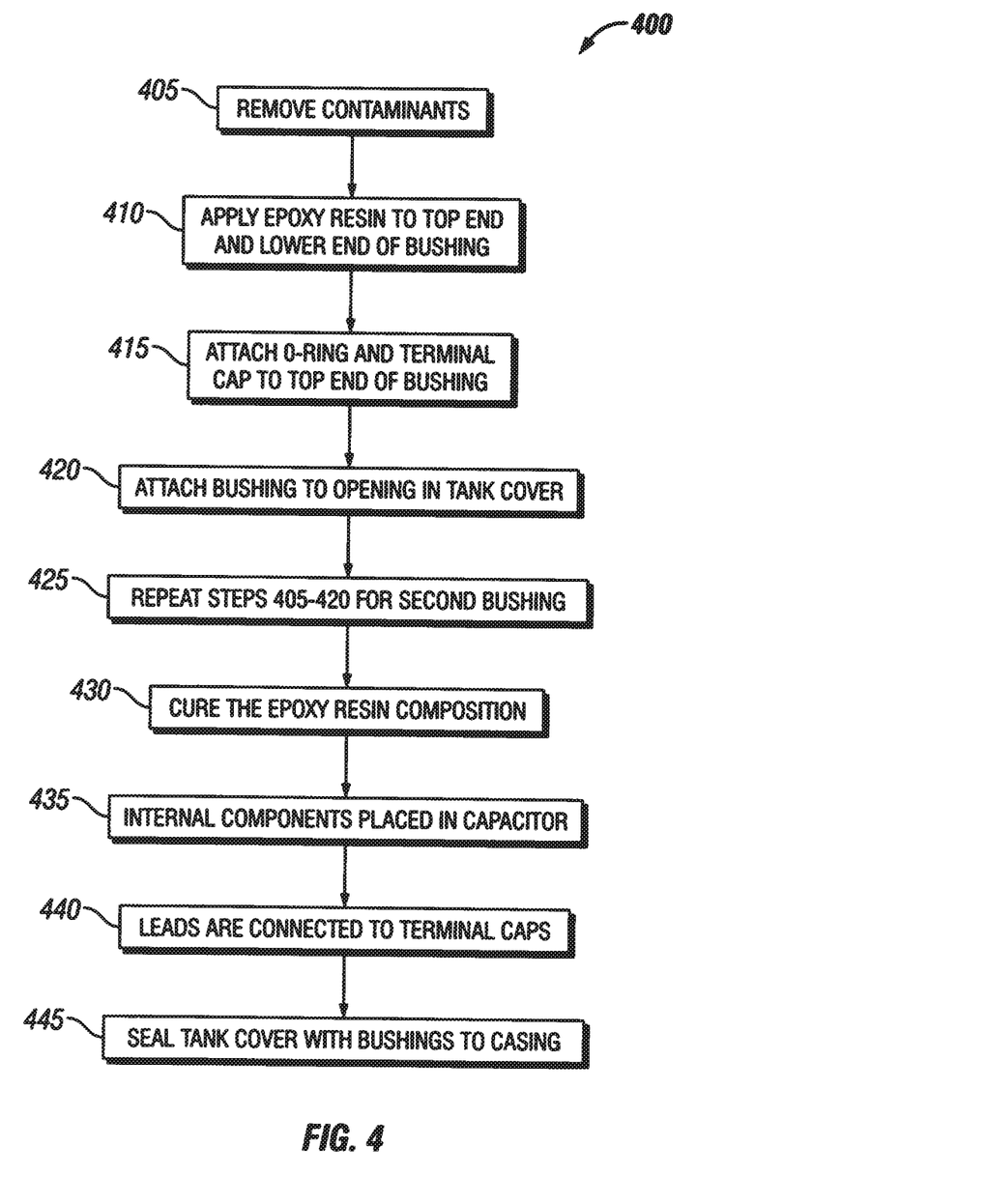
FIG. 4 shows an example method for assembling a capacitor in accordance with certain example embodiments.

FIG. 4 illustrates an example method 400 for using one of the disclosed epoxy resin compositions in the manufacturing of a sealed capacitor. Referring to example method 400, in step 405, the components of the capacitor 19 shown in FIG. 3 can be cleaned to remove any contaminants. While not required in every embodiment, removing contaminants from the surfaces to which the epoxy resin composition is to be applied can improve the performance of the seal. Processes and cleaners for removing contaminants from metallic and non-metallic surfaces are well known to those in the field. However, it should be readily understood that step 405 may be unnecessary if, for example, there are no contaminants present on the components at the beginning of the manufacturing stage.

In step 410 of example method 400, an epoxy resin composition, such as one of the compositions disclosed herein, is applied to the top end 48 and the lower end 50 of the bushing 40. In step 415, the O-ring 46 and the terminal cap 42 are placed on the top end 48 of the bushing 40. As indicated previously, certain embodiments may not include the O-ring 46. In step 420, the bushing 40 is inserted into opening 52 in tank cover 44. For certain capacitors such as capacitor 19 shown in FIGS. 1-3, steps 405 through 420 are repeated in step 425 for a second bushing that is inserted into the second opening 52 in tank cover 44. In alternate embodiments, a capacitor may have more than 2 bushings requiring that steps 405 through 420 be repeated more than once. In yet another alternative embodiment, a capacitor may have only a single bushing such that steps 405 through 420 would not need to be repeated.

Once the pair of bushings is inserted into the tank cover 44, in step 430 the epoxy resin composition is cured. While the curing step can be accomplished through a variety of means, one typical method is by heating of the epoxy resin composition to a predetermined temperature. Heating the epoxy resin composition can be performed through a variety of means including convection heating, infrared heating, induction heating, and heating by irradiation. When curing using heat, the curing step typically requires heating the epoxy resin composition to a temperature between 80° C. and 160° C. Certain epoxy resin compositions require that the composition be held at a temperature between 80° C. and 160° C. for about 30 minutes to about 120 minutes. In other embodiments, even longer periods of heating are required for curing.

In step 435, the internal components of the capacitor such as the capacitor windings 10, the taps 17 and 18, and the leads (not shown) are placed inside the casing 20. In step 440, the leads are connected to the terminal caps 42. Lastly, in step 445, the tank cover 44 with the attached bushings 40 is sealed to the casing 20. Although not illustrated in exemplary method 400, those in the field will appreciate that the dielectric fluid is typically added to the capacitor through an opening or fill valve after the tank cover 44 with the attached bushings 40 is sealed to the casing 20.

Method 400 is only one example of a process for manufacturing a capacitor in accordance with the current disclosure. Those of skill in the field will recognize that certain of the steps in example method 400 may be omitted or revised without diverging from the scope of the current disclosure. For instance, with respect to steps 410 and 415, they may be modified such that the epoxy resin composition is instead applied to the inside surface of the terminal cap 42 and the inner edge of the opening 52 in the tank cover 44. In yet another embodiment, steps 410 and 415 may be modified such that the epoxy resin composition is applied to the top end 48 and the lower end 50 of the bushing 40 as well as the inner surface of the terminal cap 42 and the inner edge of opening 52 in the tank cover 44. In yet another embodiment, steps 410-420 and 445 can be modified such that the tank cover 44 is first attached to the casing 20 followed by steps 410-420.

In yet another embodiment, the epoxy resin composition may be a two-part system where the two parts of the composition are combined as part of the process of applying and curing the epoxy resin composition. As one example of a two-part system, the epoxy resin composition can comprise a first part that comprises an epoxy and a second part that comprises a curing agent. The first part and the second part of the two part system can be combined immediately prior to applying the composition to the bushing 40 and/or the inner surface of the terminal cap 42 and the inner edge of the opening 52.

In yet another alternative embodiment, the two-part system can be combined when the bushing 40 is brought into contact with the terminal cap 42 and the edge of the opening 52 in the tank cover 44. For example, a first part of the two-part system can be applied to the top end 48 and the lower end 50 of the bushing 40. A second part of the two-part system can be applied to the inner surface of the terminal cap 42 and the inner edge of the opening 52 in tank cover 44. When the bushing 40 is brought into contact with the inner surface of the terminal cap 42 and the inner edge of the opening 52, the first part and the second part of the two-part system are combined and cured. The first part can be the epoxy and the second part can be the curing agent. Alternatively, the first part can be curing agent and the second part can be the epoxy. These and other variations of example method 400 will be understood to those of skill in the field.

The following tables provide test data for examples of various commercially available epoxy resin compositions that were tested for potential use in a capacitor application. As the tables below indicate, only certain of the tested epoxy resin compositions exhibited the properties necessary for use in a capacitor application. Table 1 shows lap shear strength in psi for various epoxy resin compositions tested at a high temperature (HT) of 75° C. to 90° C. and a room temperature (RT) of 25° C. In the instances in Table 1 where no data is present, no testing was performed.

TABLE 1

| No. | Product Name | Lap shear (HT) (psi) | Lap Shear (RT) (psi) |
|---|---|---|---|
| 1. | 3M DP420 epoxy | <800 | 3220 |
| 2. | 3M 2216A/B epoxy | no data | 1656 |

TABLE 1-continued

| No. | Product Name | Lap shear (HT) (psi) | Lap Shear (RT) (psi) |
|---|---|---|---|
| 3. | 3M 2214 epoxy | 859 | no data |
| 4. | Loctite 7387/331 acrylic | <800 | 3200 |
| 5. | Loctite E-214 HP epoxy | 5099 | 3813 |
| 6. | Delo America Delomonpox 6093 epoxy | no data | 1244 |
| 7. | Lord EP-870 epoxy | no data | no data |
| 8. | Masterbond Sup 10HT epoxy | 3782 | 3006.92 |
| 9. | Masterbond EP21TDCHT epoxy | no data | 2543.88 |
| 10. | Cyberbond Cybercryl 800 acrylic | no data | 1722.52 |
| 11. | Permabond PT328 polyurethane | 190 | 2580 |
| 12. | Permabond ES578 epoxy | no data | 1898.296 |
| 13. | Permabond ES569 epoxy | 2868 | 3417.24 |
| 14. | Permabond ES550 epoxy | 2931 | 3952.56 |

As Table 1 indicates, sample numbers 5, 8, 13 and 14 provided the best lap shear strength at the temperatures at which the testing was performed. Common characteristics found in sample numbers 5, 8, 13 and 14 include an amine containing hardener and an epoxy resin comprising a phenol novolac epoxy or a bisphenol A epoxy.

Figure 7:
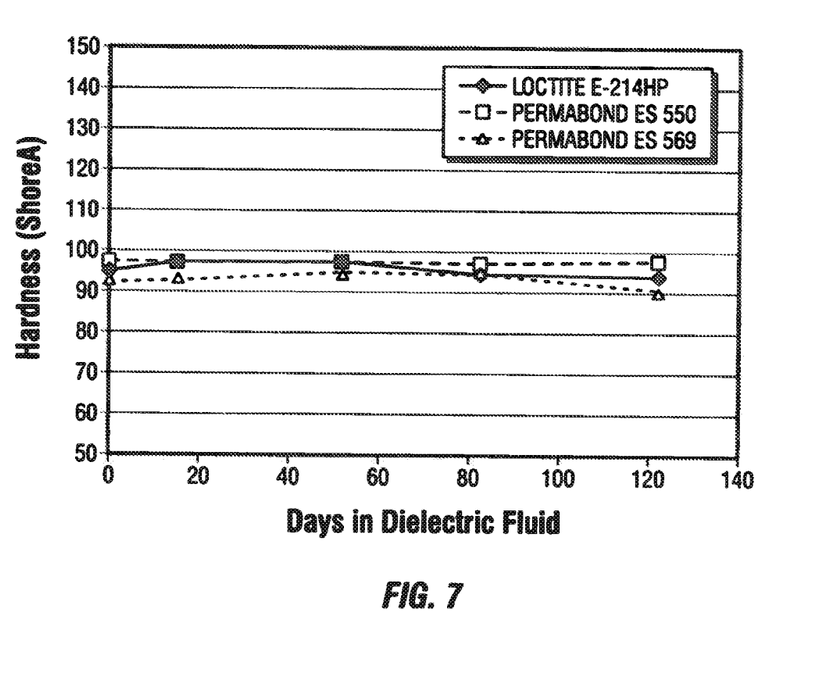
FIG. 7 shows the assessment of the hardness of the cured seal in accordance with certain example embodiments before and after exposure to the aromatic dielectric fluid.

Additional test data for the samples showing the most favorable characteristics are shown in Table 2 (below) and in FIG. 7. In order to assess compatability of the aromatic dielectric fluid with the cured seal, cured seals were formed from samples 5 and 8 on example apparatus containing the aromatic dielectric fluid Edisol VI, a commercially available dielectric fluid. The apparatus was heated to 75° C. for two weeks. Table 2 shows the measurements of certain properties of the aromatic dielectric fluid in the apparatus before (A) and after (B) the heating period.

TABLE 2

|  | D1816 | Dissipation factor | DC Leakage | Surface Tension | Acid | Condition |
|---|---|---|---|---|---|---|
| Specification | >60 kV | <0.0010 | <0.10 μA | >40 dynes/cm | <0.10 mg KOH/g | Clear, Clean |
| Loctitie E214HP (A) | 64 | 0.0008 | 0.03 | 41.8 | 0.003 | Clear, Clean |
| Loctitie E214HP (B) | 62 | 0.0007 | 0.02 | 41.6 | 0.003 | Clear, Clean |
| MS 10HT (A) | 66 | 0.001 | 0.05 | 40.8 | 0.002 | Clear, Clean |
| MS 10HT (B) | 62 | 0.0011 | 0.04 | 40.9 | 0.003 | Clear, Clean |

In particular, the data in Table 2 shows that cured seals formed from samples 5 and 8 performed well in that they did not have an adverse effect on a dielectric fluid that could be used in the capacitor. For example, comparing the test samples before the heating period (A) and after the two week heating period (B), shows there was relatively little change in the properties of the dielectric fluid. The data in Table 2 shows the cured seals did not materially affect the electrical properties of the dielectric fluid such as the breakdown voltage (tested using ASTM D1816), the dissipation factor (tested using ASTM D924), or current leakage. Techniques for measuring current leakage are generally known to those in the field. The data in Table 2 also shows no material changes in the measured surface tension, the acidity, or the visible appearance of the dielectric fluid when comparing data collected before the heating period (A) and after the two week heating period (B). The figures in the row labeled Specification are typical target values for each property.

The impact of the aromatic fluid on the hardness of cured seals formed from samples 5, 13 and 14 was also evaluated. FIG. 7 shows hardness test data for samples 5, 13 and 14 throughout 120 days of exposure to aromatic dielectric fluid at 75° C. In particular, FIG. 7 shows that the aromatic dielectric fluid did not have an adverse effect on the hardness of the cured seals formed from samples 5, 13 and 14 even after 120 days of exposure to the aromatic dielectric fluid.

Samples 5, 13 and 14 were also subjected to other tests to ensure they would withstand the harsh environmental conditions to which capacitors are subjected. Additional tests that the samples withstood included a thermal shock test, a salt spray test, a UV test, a condensation test, and a helium leak test.

The thermal shock test was performed on assemblies that included a capacitor tank cover with bushings attached using sample 5 from the Table 1. The thermal shock test involved heating the assemblies to 110° C. and then quickly moving the assemblies to a chamber held at a temperature of −50° C. overnight. The assemblies were then warmed in a room at room temperature and subjected to load testing. There was no statistical difference in the performance of the assemblies under the load testing when comparing testing results of samples subjected to the temperature changes with samples that were not subjected to the temperature changes.

Samples 5, 13 and 14 from Table 1 were applied to a piece of stainless steel and subjected to a salt spray test in accordance with ASTM B117 for 2000 hours. The samples were examined after the 2000 hours of exposure to salt spray and showed no evidence of delamination, no evidence of creepage from scrap, and no change in the pencil hardness of the cured seal.

Samples 5, 13 and 14 from Table 1 were also applied to a piece of stainless steel and subjected to ultraviolet light exposure in accordance with ASTM D4587 for 2000 hours. Examination of the samples after the 2000 hours of exposure to ultraviolet light showed a change in color but no change in the pencil hardness of the samples.

Samples 5, 13 and 14 from Table 1 were also applied to a piece of stainless steel and subjected to condensation testing in accordance with ASTM D4586-99 for 2000 hours. Examination of the samples after the 2000 hours of exposure to condensation showed no evidence of delamination and no change in the pencil hardness of the cured seal.

Lastly, example capacitor assemblies made with cured seals from epoxy resin samples 5, 13 and 14 from Table 1 were subjected to a helium leak test. The helium leak test demonstrated that a hermetic seal was maintained with each sample.

Figure 5:
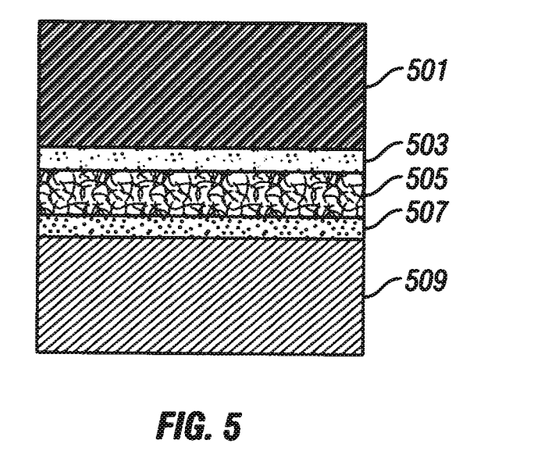
FIG. 5 is a representation of an adhesive bonding a ceramic material and a metallic material in accordance with certain example embodiments.

Referring now to FIG. 5, a representation is shown of an adhesive 505 bonding a ceramic material 501 to stainless steel 509. The representation shown in FIG. 5 provides a general illustration of how an adhesive 505, such as the epoxy resin compositions disclosed herein, can be used to join dissimilar materials such as a ceramic material 501 and a metallic material such as stainless steel 509. As illustrated in FIG. 5, a ceramic material 501 will often have an outer glaze layer 503 to which the epoxy resin composition is applied. On the opposing face of the joint, the metallic material 509 typically has an outer oxidation layer 507 caused by exposing the metallic material to moisture typically present in the atmosphere. As shown in the generalization in FIG. 5, the epoxy resin compositions disclosed herein can be used to join a variety of dissimilar materials and are not limited to the capacitor example described in connection with FIGS. 1 through 4. As explained above, the epoxy resin compositions disclosed herein can be used to join a variety of dissimilar materials subjected to stress and harsh environmental conditions such as fuses, switchgear, regulators and transformers.

Figure 6:
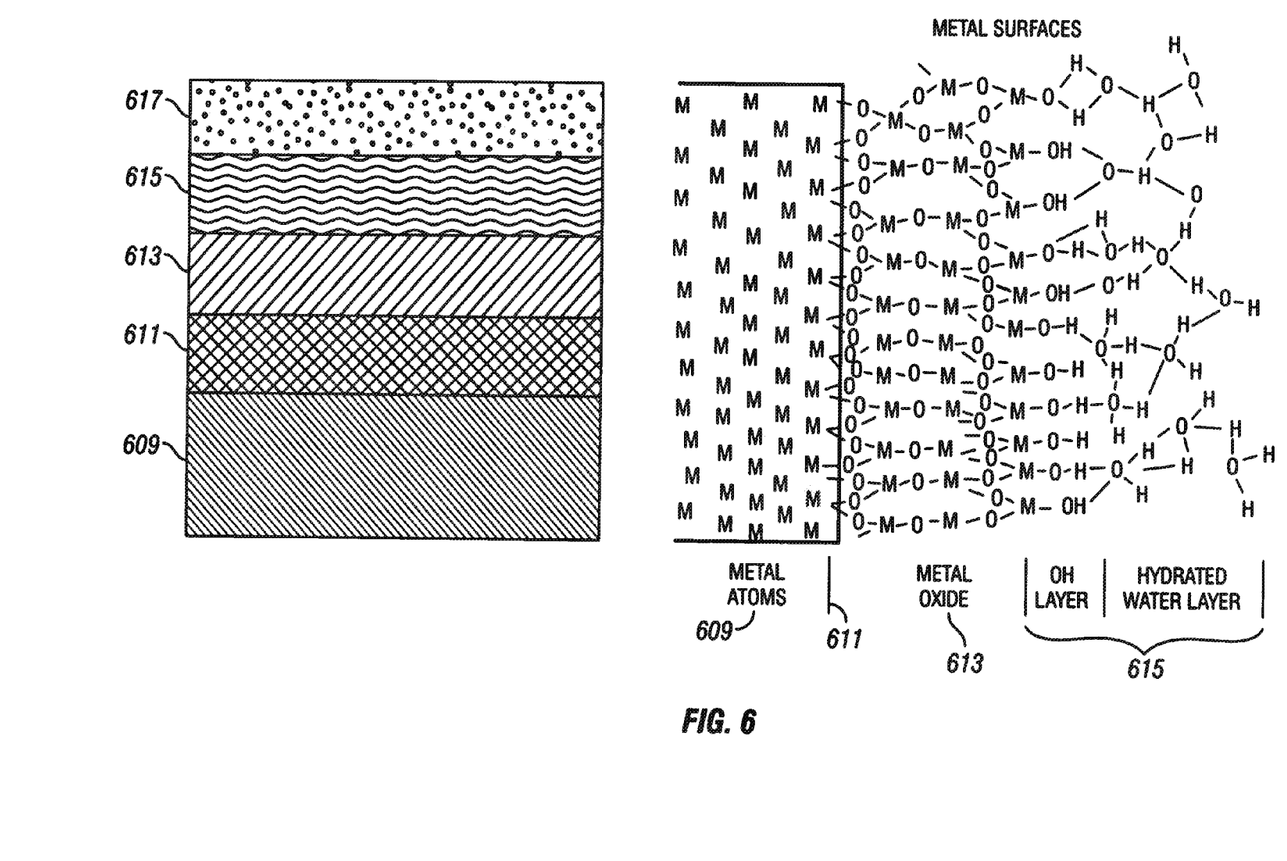
FIG. 6 is a representation of a metallic surface in accordance with certain example embodiments. The illustration on the left displays the chemical composition of the layers of a metallic surface before removal of contaminants. The illustration on the right represents the chemical interaction of the layers of a metallic surface after removal of contaminants.

FIG. 6 provides an example illustration of the metallic material portion of the joint in greater detail. In particular, FIG. 6 shows in greater detail the layers that can be found in oxidation layer 507 of FIG. 5. At the base of the metallic layer is the bulk stainless steel 609. The bulk stainless steel layer 609 comprises primarily metallic molecules. Moving towards the outer layers of the steel, the next layer is the segregation layer 611. The segregation layer 611 is the interface between the bulk stainless steel 609 and the metal oxide layer 613. The metal oxide layer 613 comprises primarily metal oxide molecules. Continuing to move outward from the steel, the next layer is the hydroxide and moisture layer 615. On the right-hand side of FIG. 6, layer 615 is shown in greater detail as having a distinct hydroxide layer and a distinct hydrated water layer. Finally, layer 617 of FIG. 6 represents oils and contaminants that may be present on the outermost layer of the metallic material. Preferably, the oils and contaminants are removed prior to application of the epoxy resin composition so as to maximize the interaction of the epoxy groups with the hydroxide moieties. Those of skill in this field will appreciate the illustration of FIG. 6 is an example and metallic materials other than steel or steel subjected to different environmental conditions may have different oxidation layers than those illustrated in FIG. 6.

On the side of the joint opposite the steel 509 in the example shown in FIG. 5, the adhesive 505 (epoxy resin) is bonded to a non-metallic material such as ceramic 501. In the example shown in FIG. 5, the ceramic 501 has an outer glaze layer 503 that typically comprises metal oxides. Similar to the bonding that occurs between the epoxy resin and the metallic layer as described in connection with FIG. 6, the epoxy resin interacts with the metal oxides present in the glaze layer 503 to form a chemical bond. However, in alternate embodiments, the adhesive 505 can bond to ceramics with glaze layers made of other materials or without any glaze layer. Although the examples above refer to ceramic 501 as the non-metallic material, other example embodiments may use other non-metallic materials as an insulator such as a bushing made of epoxy.

The epoxy resin compositions disclosed herein are able to provide a seal between the dissimilar components of a capacitor that can withstand the harsh environmental conditions to which a capacitor is subjected. Although the example of a capacitor is provided herein, the disclosed epoxy resin compositions can be applied to join dissimilar materials in other types of equipment as well.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of forming a cured seal between an insulating bushing and a metallic tank cover of a capacitor tank, comprising the steps of:
   a. applying an epoxy resin composition to a portion of one or both of the insulating bushing and the metallic tank cover;
   b. contacting the insulating bushing to the metallic tank cover such that the epoxy resin composition forms a seal between the insulating bushing and the metallic tank cover;
   c. curing the seal to form the cured seal; and
   d. attaching the tank cover with the sealed insulating bushing to a casing of the capacitor tank, the capacitor tank to contain a fluid comprising one or more aromatic compounds,
   wherein the insulating bushing essentially comprises glass, ceramic, polymer or glazed material;
   wherein the epoxy resin composition comprises: a phenol novolac epoxy, a bisphenol A epoxy, or a combination thereof; and a curing agent;
   wherein the cured seal withstands exposure to the fluid comprising one or more aromatic compounds; and
   wherein the capacitor tank complies with one or more of International Electrotechnical Commission standard 60871-1:2005, Section 12 and Institute of Electrical and Electronics Engineers standard 18:2012, Section 7.2.3.

2. The method of claim 1, wherein the curing agent is an amine-containing hardener.

3. The method of claim 1, wherein the curing agent is cyanamide or dicyandiamide.

4. The method of claim 1, wherein curing the seal comprises heating the seal to a temperature sufficient to cure the epoxy resin composition.

5. The method of claim 1, wherein curing the seal comprises heating the seal to between about 80° C. to about 160° C.

6. The method of claim 1, wherein curing the seal comprises heating the seal to between about 80° C. to about 160° C. and holding the seal between about 80° C. to about 160° C. for about 30 minutes to about 120 minutes.

7. The method of claim 1, wherein curing the seal comprises induction heating.

8. The method of claim 1, wherein curing the seal comprises induction heating for about 1 to about 10 minutes.

9. The method of claim 1, wherein the epoxy resin composition comprises a polymer content of at least about 50% polymer content.

10. The method of claim 1, further comprising after step b, the step of applying pressure to the seal.

11. The method of claim 1, wherein the one or more aromatic compounds are selected from the group consisting of diaryl ethanes, diaryl methanes, triaryl methanes, triaryl ethanes, biphenyls, monoaromatics and naphthalenes.

12. The method of claim 1, wherein the seal can withstand thermal shock from about 100° C. to about −50° C.

13. The method of claim 1, wherein the seal resists breakage after 2000 hours of exposure to one or more of salt spray, ultraviolet light, and 100% relative humidity.

14. The method of claim 1, wherein the hardness of the seal decreases less than 2% after 120 days in the fluid comprising one or more aromatic compounds.

15. The method of claim 1, wherein the cured seal is hermetic.

\* \* \* \* \*